United States Patent [19]

Gerry

[11] 4,288,723
[45] Sep. 8, 1981

[54] INDUCTIVE-CAPACITIVE CYCLIC CHARGE-DISCHARGE IGNITION SYSTEM

[76] Inventor: Martin E. Gerry, 13452 Winthrope St., Santa Ana, Calif. 92705

[21] Appl. No.: 112,715

[22] Filed: Jan. 16, 1980

Related U.S. Application Data

[63] Continuation-in-part of Ser. No. 35,013, May 1, 1979, abandoned.

[51] Int. Cl.³ .................... H05B 37/02; H05B 39/04; H05B 41/36
[52] U.S. Cl. ................................ 315/209 R; 123/606; 123/637; 315/170; 315/171; 315/172; 315/173; 315/176; 315/209 T
[58] Field of Search ............... 315/170, 171, 172, 173, 315/174, 176, 209 T, 209 R; 123/620, 621, 622, 623

[56] References Cited

U.S. PATENT DOCUMENTS

| | | | |
|---|---|---|---|
| 3,837,326 | 9/1974 | Kamiji | 123/620 |
| 3,919,993 | 11/1975 | Neuman | 123/620 |
| 3,972,315 | 8/1976 | Munden et al. | 315/171 |
| 3,993,035 | 11/1976 | Gerry | 123/620 |
| 4,033,316 | 7/1977 | Birchenough | 317/176 |
| 4,083,347 | 4/1978 | Grather et al. | 123/620 |
| 4,206,737 | 6/1980 | Gerry | 315/209 R |
| 4,216,412 | 8/1980 | Gerry | 315/176 |

*Primary Examiner*—Saxfield Chatmon, Jr.

[57] ABSTRACT

An inductive-capacitive cyclic charge-discharge ignition system includes an ignition transformer primary winding in parallel with a capacitor and fed by an alternating current source providing a plural number of repetition cycles during each igniter firing period. Such repetition cycles cause the capacitor and primary winding to charge and discharge during each of the repetition cycles creating a plurality of ringing periods for each igniter firing period. A diode or an additional capacitor, or both, inserted in series with the parallel combination of the first stated capacitor and primary winding, substantially increases the velocity of arc provided by an igniter. Such arc has several components composed of luninous particles extending across the entire base of the igniter.

10 Claims, 21 Drawing Figures

INDUCTIVE-CAPACITIVE CYCLIC CHARGE-DISCHARGE IGNITION SYSTEM

CROSS REFERENCE TO RELATED APPLICATION

This application is a continuation-in-part of copending application Ser. No. 35,013 filed May 1, 1979, now abandoned.

BACKGROUND OF THE INVENTION

This invention is in the field of ignition systems for fuel burning engines and in particular in such ignition systems which have both a capacitor and an inductive winding of an ignition transformer cyclically charged and discharged in discharge aiding mode, and more particularly wherein such system produces a high velocity igniter arc.

The principal prior art ignition systems may be categorized into three groups. The first category of such prior art systems, referred to as the Kettering system, uses a capacitor in series with a primary winding of an ignition transformer wherein the capacitor is short-circuited by a timer so as to permit the primary winding to be charged by a DC source. The timer then removes the short circuit from the capacitor to permit the charged winding to discharge into the capacitor so as to create a single ringing circuit component, used to fire an igniter.

The second category of such prior art systems, referred to as a capacitive discharge system, also has a capacitor in series with an ignition transformer winding. Controlled by an appropriate timer, the capacitor is charged, generally by a higher DC voltage than in the Kettering system, such higher DC voltage being generated in the system. The timer then enables the charged capacitor to discharge into the transformer winding also creating a single ringing current component of somewhat higher voltage peak than the Kettering system to fire an igniter.

The third category of such prior art systems involves the use of a generated AC wave by such prior art system and attempts to apply such generated wave either to an ignition transformer or directly to a distributor in order to fire an igniter.

With respect to the first category, or Kettering prior art system, the main problem lies in the fact that the system attempts to precharge an inductor using a DC source in anticipation of an igniter firing cycle. It is well-known that an inductor energized by DC cannot charge to its full current level in a short period of time, and therefore, cannot rapidly produce an induced voltage therein. Hence, only a portion of the maximum current quantity can be made to flow through the primary winding during the charging mode, with consequent nonuse of the full energy storage capability of such primary winding, and therefore, loss of electrical power delivery capability of fire the igniter is experienced.

The current conduction through an inductor powered by a DC source, such as a battery, when switched on by the timer may be expressed as:

$$i = \frac{V_{dc}}{R}\left(1 - e^{-\frac{R}{L}t}\right)$$

where i is the current at any instant of time, t is time, $V_{dc}$ is the voltage provided by the DC source, R is the circuit resistance of the inductor and DC source, L is the inductance of the primary winding and (R/L) is the time constant of the circuit.

From such equation, it can be seen that when $t=0$, $i=0$, and when t approaches infinity, i approaches the value of ($V_{dc}$/R). Based on typical values of L and R, it would take about 100 milliseconds for the primary winding to be almost fully charged, and a typical primary winding charging period is generally not greater than 5 milliseconds.

It is, therefore, obvious that the use of a DC source to charge the primary winding of the Kettering or first category of ignition systems is self-defeating in that possibly no more than half the inductor's charge capacity can be effectively utilized.

With respect to the second category or capacitive discharge system, a like result, with very little improvement over the Kettering system, is realized.

In such second category system, the higher DC voltage to precharge the capacitor is obtained by using an electronic oscillator to generate a higher AC voltage which is then converted to DC by rectification and filtering. The higher DC voltage is controlled by a timer to precharge the capacitor and then discharge the capacitor into the ignition transformer winding to fire an igniter. If one keeps in mind that a charged capacitor is just like a DC source, then one can apply the foregoing equation which defines current in the transformer winding. Although the value of $V_{dc}$ representing the charged capacitor will be higher than in the case of the Kettering system, one must not lose sight of the fact that the energy content of a charged capacitor is limited by the capacitance and hence its ability to deliver current for an extended time period is limited. Hence, although a higher peak single ringing cycle will result due to the charge from the capacitor being dumped into the transformer winding, the single ringing period will be substantially shortened compared with the single ringing period of the Kettering system.

Since energy is a function of the product of power and time, the advantage of the capacitive discharge system over the Kettering system is minimized due to the lesser amount of time during which energy is present to fire the igniter.

With respect to the third category of prior art ignition systems or the AC systems, the major problem resides in the inability of the prior art to recognize how to transfer the power from the AC generator to the load, the load generally being a transformer. Consequently, although such system might basically be able to provide AC power over longer periods of time, these systems suffer from the lack of technique in effectively transferring such power and particularly providing higher current levels to the load.

The need for such higher current levels has been repeatedly stated in periodicals and patents written by those in the automotive manufacturing industry and in the automotive fuel-producing industry such as Texaco. Such periodicals or patents generally show a high power AC rectangular wave generator employing a transformer wherein one of the windings thereof is used to saturate the transformer core by employing a DC source connected to that winding, so as to prevent the generator from producing power. A timer, coupled to such winding, enables the core to go out saturation, and ostensibly enables the generator to provide AC power by magnetic induction through a high voltage winding of the transformer to an igniter load.

The basic problem with such generator resides in the high impedance experienced in the electronic circuit of the generator where the trnasistors are located, when under actual load conditions such as when the igniter is attempting to arc. Reflected impedance of the high voltage winding into the lower voltage winding to which the transistors are connected plus the self-impedance of such lower voltage winding would severely limit the current circulating in the collector-emitter circuits, and consequently would result in a lowered voltage and severely reduced current levels deliverable to the actual igniter. Thus, not only is the voltage across the so-called high voltage winding of such prior art AC system lower than expected, but the required higher current level for feeding the igniter in order to overcome high pressure fuel-flow across the igniter base, and in particular where the air-to-fuel ratio is in the order of 18 to 1 or greater (lean-burn engines), is not available.

Additionally, such prior art AC systems are inhibited from rapid duty cycling of their AC generator principally by magnetically saturating the generator's transformer core to inhibit oscillations. Sight is lost of the fact that the DC current used to saturate such core results in a comparatively long time for the core to reach saturation (see formula above), and hence slows up the cycling of the generator between its operative and quiescent mode. As a result, the prior art AC systems provide triangular-shaped current waveforms which inherently have slow rates of change in their waveforms as a function of time and therefore result in a reduced induced voltage in the high voltage winding, inasmuch as by Faraday's law of induction, such reduced voltage is a function of the rate of change of current. It can be appreciated that if, for example, the prior art could have overcome the above problems residual in their AC source and could provide a current waveform output with a fast rate of change, such as one approaching a rectangular waveshape, at least the output voltage of such generator would be increased. However, the problem of being able to deliver higher currents to the load would still remain unsolved.

Accordingly, neither the Kettering, capacitive discharge, nor AC system is capable of delivery of sufficient quantities of energy to fire an igniter, in order to enable the igniter to cause all fuel in an engine cylinder to be consumed and not wasted by failure of the ignition arc to burn same.

A further disadvantage of prior art ignition systems is that they cannot charge the inductor or transformer winding and the capacitor in a way so that discharge currents therefrom are additive and aid each other.

A still further disadvantage of the prior art systems is their inability to deliver sufficient energy to fire an igniter for extended periods of time.

Yet a further disadvantage of the prior art systems is their inability to deliver more than one ringing cycle during an igniter firing period.

Yet another disadvantage of the precharged inductor or capacitor prior art systems is their inability to rapidly charge the inductor due to use of DC power, with attendant inability to deliver sufficient energy to fire an igniter so as to effectively cause all the fuel to burn during an igniter firing period.

Yet another important disadvantage of any prior art system is the inability of the system to accelerate the arc luminous particles to such high velocity so that such arc can adequately overcome internal engine and fuel-flow pressures. Such prior art systems are therefore unable to use an igniter that develops long arc lengths between its electrodes. Such deficiency results in initation of a small fuel ignited nodule during the initial ignition period which is insufficient in mass and area to cause all fuel in a cylinder to be consumed and not wasted.

Other disadvantages with such prior art systems reside in their complexity due to the need of a large quantity of electronic components which also gives rise to unreliability as well as high cost of production.

Exemplary of prior art systems is U.S. Pat. No. 3,714,507 which is a capacitive discharge system. A charge retention storage capacitor is charged by a relatively high DC voltage source, and the charge from the charge capacitor is discharged through an ignition transformer primary winding by utilizing a silicon controlled rectifier switch. Another capacitor across the primary winding is selected of such value so as to suppress electromagnetic interference due to discharge of the storage capacitor.

Another example of prior art is U.S. Pat. No. 3,312,860 which operates on a similar principle to that of U.S. Pat. No. 3,714,507, except that its high voltage DC power source is of a different design.

Still another example of the prior art is U.S. Pat. No. 3,972,315 which utilizes two ignition transformer primary windings. One of such windings is energized by the discharge of a precharged capacitor from a DC source, whereas the other of these primary windings has a discharge current passing therethrough to combine with the capacitive discharge into the first named primary winding. This would be the principle of operation if the system were operative, but such system is precluded from operation by a hard-wire short circuit across the second named primary winding.

All of these exemplary systems miss the major point of technology of not utilizing rectangular or other AC power to feed the ignition transformer primary winding, and to feed such components as are connected in the primary winding circuit with AC power, and thus such systems cannot obtain the extremely high energy levels that would otherwise be possible when exciting the ignition transformer primary circuit components with AC power.

SUMMARY OF THE INVENTION

Accordingly, one objective of this invention is to provide an ignition system which would deliver a high energy quantity during each igniter firing period so that all fuel in the engine cylinder would be ignited and converted to useful power without passing any unignited fuel into the engine's exhaust system.

A further objective of this invention is to devise an ignition system wherein the primary winding of the ignition transformer and a capacitor connected thereto would be charged in such way so that discharge currents from the primary winding and capacitor would be additive so as to increase the energy content fed to the igniter.

A still further objective of this invention is to provide an ignition system having a plurality of charge-discharge cycles of both the primary winding and capacitor connected thereto during any one igniter firing period so as to further increase the energy level fed to the igniter during such firing period.

Yet another objective of this invention is to utilize a power source to charge the primary winding and the capacitor connected thereto which will enable such primary winding and capacitor to be charged rapidly and fully.

Still another important objective of this invention is to provide an ignition system which will develop long arcs across the bases of igniters and wherein such long arcs, composed of luminous particles, shall have velocities substantially higher than velocities of arcs developed either by a Kettering, capacitive discharge or prior art AC systems, so as to overcome high internal engine pressures and high pressure fuel-flow past the electrodes of the igniters.

Yet a further object of this invention is to provide highly reliable electronic circuitry using a minimum number of parts and simple in structure.

Hence, a system is provided which utilizes an electronic repetitive wave generator which is electrically duty cycled, and which generator provides an output of a plurality of AC waves during each igniter firing period.

The primary winding of an ignition transformer is connected in parallel with a capacitor, and the parallel combination is connected to the output of the AC wave generator.

The AC generator waveform output has the ability to charge both the capacitor and primary winding during each half of each repetition period of its output waveform. The manner in which the capacitor and primary winding are charged during each first half cycle of each of the generator's repetition periods enables discharge currents from the capacitor to add to the discharge currents of the primary winding, thereby creating a large amplitude ringing cycle having relatively steep wavefronts during each other half of the generator's repetition periods, resulting in a plurality of ringing cycles with extremely high energy content delivered to an igniter for firing such igniter during each igniter firing period.

By inserting either a diode or another capacitor, or both, between the AC generator's output circuit and the parallel combination of the primary winding and capacitor, the velocity of an arc, created at the base of the igniter, is substantially increased as compared with the arc velocity where an igniter is powered by either a Kettering, capacitive discharge or prior art AC system.

Additionally, the inventive system enables an igniter which is about 250 thousandths of an inch in dimension between its arcing electrodes, to create an arc which may be as long as 350 thousandths of an inch. Such dimension between electrodes is established by removing the gap-adjusting member from a conventional igniter so that arcs can travel between the axial electrode and the inner base periphery. Such arc length would be extinguished in prior art igniter systems, even if such systems were capable of producing such arcs, due to the high internal engine pressure. However, the increased arc velocity of the inventive system, easily overcomes such engine pressure and inhibits extinguishment of these long arcs, which provides for better fuel combustion.

The arc phenomena per se is a matter of additional importance. Such arc is comprised of an elongated filament of highly concentrated luminous particles, which filament extends between the axial electrode and base. The filament is increased in thickness at its ends. Surrounding such filament is an envelope of luminous particles of lesser density than the filament, such envelope having approximately spherically-shaped terminations which will often glow like a light bulb. Under certain voltage and current conditions, the filament will jump out from its envelope and take a path of travel outside the envelope between the axial electrode and base but generally adjacent to the same radial direction as the envelope portion-path of travel.

DETAILED DESCRIPTION

Figure 1:
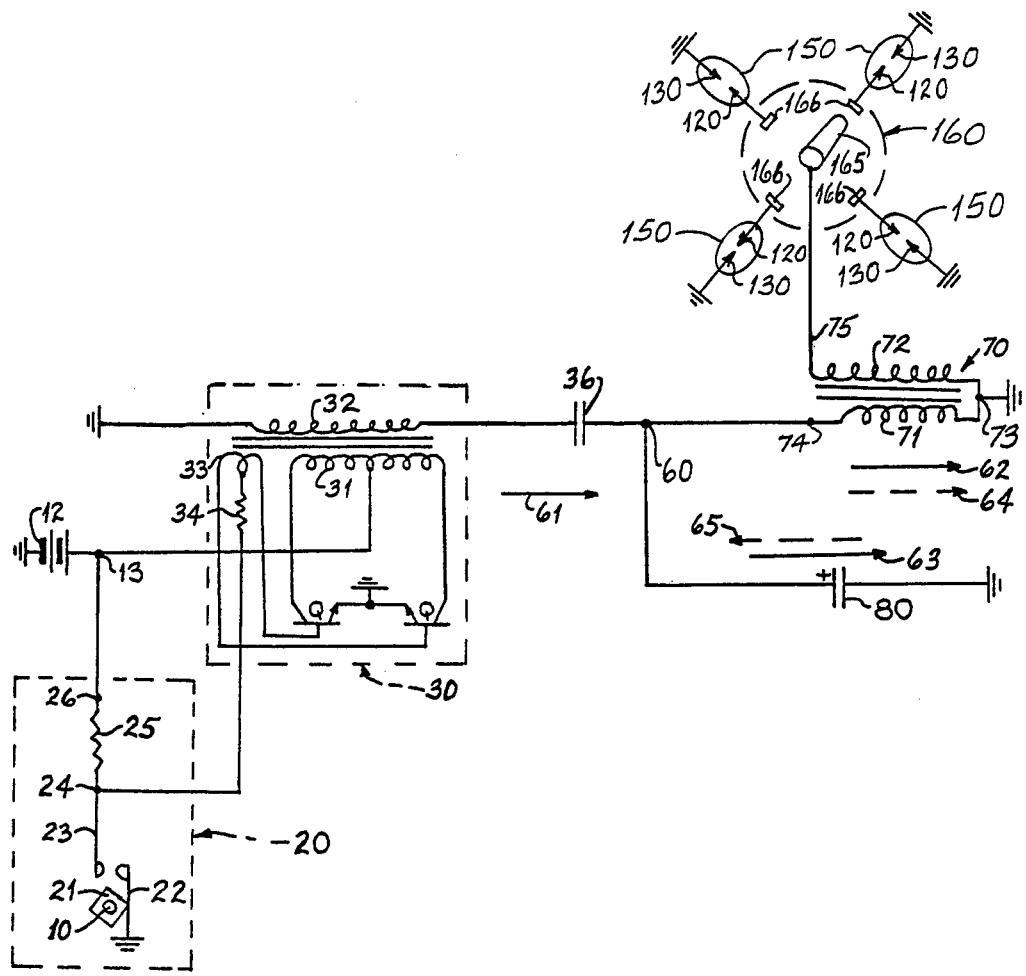
FIG. 1 is an electrical schematic of the ignition system in accordance with the invention having a switchless output network.

Referring to FIGS. 1, 1a through 1g, and 2, an ignition system delivering large quantities of electrical energy to an igniter or igniters in a fuel combustion engine, employs the principle of creating a plural number of inductive-capacitive charge-discharge cycles during any one igniter firing period. Such system is basically simple in its configuration, utilizing a minimum number of electronic components and is highly effective as well as reliable in its operation.

A conventional ground symbol in the drawings refers throughout this specification to negative battery potential which is the zero reference level for DC or AC voltages or currents, and is also a signal return path for AC signals.

Battery 12 provides DC power from its positive terminal 13 to timer 20 and to the center-tap of winding 31 of a transformer used in AC generator 30.

Timer 20 is activated by means of cam 21 driven by a conventional distributor shaft 10 so that contactors 22 and 23 are closed and opened in alternation.

Figure 2:
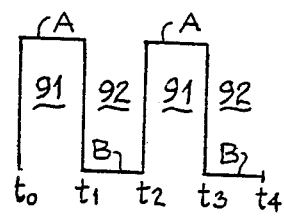
FIG. 2 is a waveform representing the output of an AC generator used in the system of FIG. 1, 1a, 1b, 1c or 1d.

When none of the high portions of cam 21 cooperates with contactor 22, contactors 22 and 23 are closed, and when one of the high portions of cam 21 cooperates with contactor 22, contactors 22 and 23 are open. Contactor 23 is connected at junction 24 to resistor 25, and resistor 25 is connected at junction 26 to positive DC terminal 13 of battery 12. Junction 24 is the point in this timer circuit used to connect to the biasing circuit of alternating current generator 30, which generator provides its waveform voltage output across winding 32, producing oscillations between its minimum levels at B and its maximum levels at A, as shown in FIG. 2.

The purpose of resistor 25 is to provide a positive DC potential to the bias circuit of generator 30 when contactors 22 and 23 are open, and also to provide a ground or zero potential to such bias circuit when contactors 22 and 23 are closed without placing a shortcircuit across battery 12. The logic provided by timer 20 to circuit 30 may be briefly stated by the following table:

| Contactors 22 and 23 | DC Potential at Junction 24 | Condition of Generator 30 |
| --- | --- | --- |
| closed | 0 | does not oscillate |
| open | + | oscillates |

Timer 20 was chosen for its simplicity so as to more easily illustrate and explain the switching functions of this system. But it should be noted that a disk-contactor timer, a magnetically generated pulse timer or an optical beam pulse timer as illustrated in FIGS. 1e, 1f and 1g respectively may be substituted for timer 20, if desired.

The FIG. 1 system excludes all diodes, utilizing capacitors 36 and 80. In such case, winding 32 is electrically connected to capacitor 36, and capacitor 36 is connected to junction 60. Junction 60 is the terminal at which primary winding 71 of ignition transformer 70 is connected in parallel with capacitor 80. When timer 20 causes contactors 22 and 23 to be closed, no energy will be provided by generator 30 and no power will be delivered to winding 71 and capacitor 80. But when timer 20 causes contactors 22 and 23 to open, winding 32 will excite such parallel circuit with AC energy. Since high voltage output cable 75 is normally connected to rotor 165 of a conventional high voltage distributor 160 having stationary members 166 which are connected to electrodes 120 of igniters 150 in a multiple igniter ignition system, or cable 75 is connected directly to an igniter's electrode 120 in a single igniter system utilizing igniter 150, in both instances the electrically conductive base 130 being at ground potential, the impedance looking into primary 71 will also include the reflected impedance due to secondary 72 feeding an arcing igniter.

High AC current flow is transferred from winding 31 to winding 32 of generator 30 by virtue of the inclusion of capacitor 36. Deletion of capacitor 36 will reduce the current flow through primary winding 71 and will also reduce the arc velocity.

The AC current flowing into junction 60 due to the AC voltage across winding 32 is represented by arrow 61, such current dividing into current component 62 which charges primary winding 71 and current component 63 which charges capacitor 80, so that one terminal of capacitor 80 is charged positively, as indicated. These charging current components are initiated during the conductive portions of each cycle of FIG. 2 such as represented by numeral 91 for every such half-cycle period.

It must be remembered that the AC voltage fed to winding 71 and capacitor 80 results in primary winding 71 and capacitor 80 being rapidly and completely charged. It should also be noted that the FIG. 2 waveform, by virtue of its rapid charging ability, avoids the disadvantage inherent in a conventional ignition system utilizing DC power, where such DC power slowly charges the primary winding of an ignition transformer.

It should be remembered that, once charged, such winding 71 and capacitor 80 will remain charged during the flat or constant voltage portion of the conductive half-cycle period 91 of the wave of FIG. 2, at the maximum level. When something happens to disturb the circuit equilibrium, such as the forcing voltage function across winding 32 feeding these components suddenly going through a transition state such as at $t_1$, to cause the FIG. 2 voltage to drop to its minimum level, discharge currents from winding 71 and capacitor 80 will start to flow as denoted by dashed arrows 64 and 65 respectively. The discharge current flow from an inductor will continue in the same direction as its charge current direction flow, but the discharge current from a capacitor will have a direction reverse to its charge current direction, thereby aiding the discharge current in the inductor.

Consequently, between time $t_1$ and $t_2$, discharge current component 64 from winding 71 will initiate its flow direction in the same direction as its charge component 62, but discharge current component 65 from capacitor 80 will initiate its discharge flow in opposite direction to its charge component 63, as indeed it has to, since current component 65 must start flowing in a direction away from the capacitor's positively charged terminal. Hence, the discharge component 65 flowing through junction 60 will be additive to the discharge component 64 thereby increasing the current flow through primary winding 71. The same charging process will be repeated during period $t_2$-$t_3$, and the same discharge process will be repeated during period $t_3$-$t_4$ for the second cycle as well as for subsequent cycles beyond time $t_4$, during any one igniter firing period, to add the capacitor discharge current to the inductor discharge current for each cycle of FIG. 2 waveform inapposite to prior art systems which only depend upon charging either an inductor or a capacitor.

It should be realized that the discharge action causes ringing type oscillation of the parallel circuit comprising inductive winding 71 and capacitor 80, by virtue of discharge current components 63 and 65 circulating in winding 71 and capacitor 80. Hence, such ringing oscillation will occur during each quiescent wave portion 92, thereby providing a plural number of ringing cycles in sequence during any one igniter firing period. Each ringing oscillation will have both positive and negative excursions or be bipolar in character. At an average engine speed of 3,000 revolutions per minute for a four-cylinder engine having a 45 degree dwell period, an igniter would fire for approximately 5 milliseconds during which time 15 ringing cycles would be experienced. At the engine idling speed, about 45 ringing cycles per igniter firing would be experienced, and at starting speeds as much as 100 or more ringing cycles would occur, thereby facilitating starting the engine. All these ringing cycles per igniter firing may be compared with the single ringing period at substantially lower voltage and current levels provided by a conventional ignition system, in order to appreciate the advantages afforded by this functionally high energy but structurally simple ignition system.

A major benefit contributed by the system shown in FIG. 1 is its switchless output network, wherein no switch either of the electronic or other type exists. Such output network consists of primary winding 71 in parallel connection with capacitor 80, and the parallel combination in series with capacitor 36 which is also in series with output winding 32 of AC generator 30.

Alternating current generator 30 provides AC voltage excursions across winding 32 as symbolically illustrated by the waveform of FIG. 2. Such voltage excursions represent the actual voltage pattern when a resistive load is connected across winding 32. A similar rectangular waveform to that shown in FIG. 2 would represent the current excursions through winding 32 and such resistive load. When the load connected to winding 32 is reactive, as herein, and when generator 30 bias current is keyed on and off, the voltage output from generator 30 will have transient spikes. However, in explaining the theory of operation of this system, the waveform without transient spikes, as shown in FIG. 2, will be assumed.

It may be seen that generator 30 supplies a voltage output across its winding 32 which is referenced to ground, the common signal return path for both AC and DC voltages and currents, as well as the common reference point for the electrical igniters used herein. Such voltage rises from the ground reference level which is also its minimum level at B to its maximum level at A, and then stays at the maximum level for one-half cycle. At the end of such half-cycle, the voltage falls to its minimum level staying at the minimum level at B for the other half-cycle. These cyclic excursions are repeated a plural number of times for any one igniter firing period.

Although a rectangular waveshape is illustrated in FIG. 2, it is pointed out that any waveshape, regular in form or complex, may be utilized in this invention as long as the waveforms are AC in nature.

It should also be noted that winding 32 could be connected to positive DC terminal 13 of battery 12 instead of ground, in which case the waveform of FIG. 2 would be shifted upward by the voltage value of battery 12. However, making such connection, though seemingly harmless, may bring about a reduction in the voltage output to the inductive-capacitive load herein, since the timer contacts are closed when the AC generator is delivering power to the load. In such case, resistor 25 would consume part of the voltage generated. If, on the other hand, resistor 25 is not electrically across battery 12 when generator 30 generates its voltage output, then the series combination of resistor 25, resistor 34 and the base-to-emitter junction of either of transistors Q is effectively across battery 12 to also deprive the load of some of the voltage across winding 32 developed by generator 30. Either of these conditions could exist with winding 32 terminated on one and at terminal 13. When transistors Q are of the PNP-type, generator 30 provides oscillations during the periods when contactors 22 and 23 are closed, or as here, when such transistors are of the NPN-type, generator 30 provides oscillations when contactors 22 and 23 are open. However, always terminating one end of winding 32 at ground potential avoids the loss of voltage generated by generator 30, no matter which type of transistors are used.

It may be noted that the voltage waveform across winding 32 is shown as a rectangular wave with cyclic excursions between the minimum and maximum levels. The minimum level at B may be regarded as the negative excusion of the FIG. 2 waveform and the maximum level at A may be regarded as the positive excusion of such waveform.

Such waveform almost resembles an ideal series of half-wave rectified signals. The advantage of using such waveform, even if it is changed in shape by use of an inductive-capacitive reactive load and is therefore no longer rectangular in shape, is that it is possible to cyclically charge and discharge the inductive-capacitive load components during any one cycle or repetition period of such wave without the need of any additional control components. Such advantage contributes to circuit simplicity with accompanied advantage of being able to generate a multiplicity of ringing oscillation periods during any one igniter firing period so as to very substantially increase the power and energy delivered to an igniter during its firing period.

When timer 20 keys generator 30 to its oscillatory mode by opening contacts 22 and 23 so as to provide a positive DC bias voltage to the bases of power transistors Q via feedback winding 33, base current is caused to flow through resistor 34 and through the base-emitter junction of one of the transistors Q. The circuit composed of one of transistors Q and one-half of winding 31 fed by +DC at its center tap will thereupon have collector current flowing therethrough in alternation with the other half of winding 31 and the other transistor Q via their respective collector-to-emitter junctions to ground so as to create the oscillatory waveform of FIG. 2. Though transistors Q are of the same type, each transistor has sufficiently slightly dissimilar characteristics so that one or the other transistor will draw collector current first to start the oscillation pirocess. This type of oscillatory circuit is generally known in the art as a Royer oscillator, although generator 30 herein has been simplified over the original Royer circuit. Generator 30 has been utilized in applicant's allowed patent applications, Ser. No. 960,871 filed Nov. 15, 1978, Ser. No. 969,075 filed Dec. 13, 1978, and Ser. No. 962,754 filed Dec. 14, 1978. Reliability has also been added to generator 30 by component reduction and by including duty cycling of such generator by switching its bias current on and off. Such switching enables operation of the transistors about half the time during a firing cycle so as to prevent their overheating and thereby improve their reliability and extend their operating life.

A single cycle of the waveform of FIG. 2 is composed of a period extending from $t_o$ to $t_2$ having a conductive portion 91 and a quiescent portion 92. Portion 91 is termed conductive since it is the half-cycle period during which time, voltage is provided by generator 30 to charge inductor 71 and capacitor 80. Portion 92 is termed quiescent since it is the half-cycle period during which time, generator 30 does not provide any output and consequently it is the cyclic portion during which inductor 71 and capacitor 80 will discharge to effect a ringing current component of decreasing amplitude and also of decreasing frequency. Keeping in mind that ringing action occurs during every cycle of rectangular wave output from generator 30, it is conceivable that any one ignition firing period may have about 60 ringing current cycles, as compared with a single ringing current cycle in a typical prior art ignition system.

Hence, when contactors 22 and 23 are initially opened for any one igniter firing period, the voltage across winding 32 rises from its minimum level at $t_o$ to its maximum level and remains substantially constant at the maximum level for the first one-half cycle, which is the conductive portion of that cycle, until time $t_1$. At $t_1$, the voltage drops to the minimum level and remains at the minimum level until time $t_2$ for the other half of the first cycle, which is the quiescent portion of that cycle. At $t_2$, the waveform starts again to rise to the maximum level to stay there until time $t_3$, at which time the voltage again drops to the minimum level and remains at the minimum level until time $t_4$, which is the end of the second cycle. Accordingly, during each conductive portion 91 of any given cycle, winding 71 and capacitor 80 are charged, and such charged components discharge during each quiescent portion 92 of the same cycle.

The rate or frequency of oscillation of generator 30 is dependent upon design of the transformer used in generator 30, but generally from 2,000 to 3,000 cycles or repetition periods per second has been found satisfactory for this ignition system. Consequently, the number of cycles or repetition periods, as exemplified by the two cycles illustrated in FIG. 2 waveform, will depend on the length of time contactors 22 and 23 stay open. When contactors 22 and 23 are closed, the zero bias provided to winding 33 of generator 30 will cut off oscillation and no output will be provided at 32. In other words, no voltage waveform as in FIG. 2 will be present across winding 32 when contactors 22 and 23 are closed.

Figure 1A:
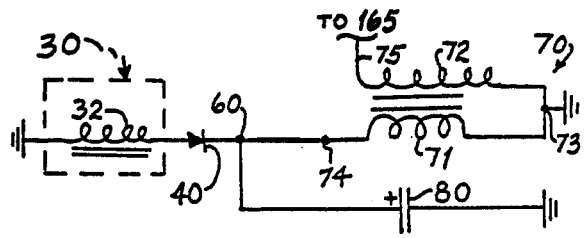
FIGS. 1a, 1b, 1c and 1d are partial schematics of switchless output networks usable in lieu of the switchless output network of FIG. 1.

FIG. 1a modifies the switchless output network of the system shown in FIG. 1 and as above discussed. Such modification of the output switchless network is in terms of using diode 40 in lieu of capacitor 36. As will be shown below in conjunction with the discussion of the oscilloscopic photographs, diode 40 also contributes a multiplicity of frequencies by its presence in the output network, causing ignition current flowing through primary winding 71 to be rich in such frequencies.

Figure 1B:
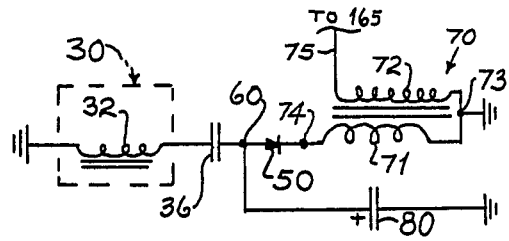

FIG. 1b modifies the switchless output network of the system shown in FIG. 1 and as above discussed. Such modification of the output switchless network is in terms of using diode 50 by connecting same between junctions 60 and 74. The basic performance of the output network of this figure is similar to that of FIG. 1 inasmuch as capacitor 36 is the component mostly contributing to the waveforms of current and voltage through and across winding 71.

Figure 1C:
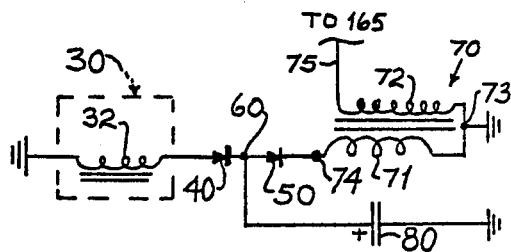

FIG. 1c modifies the switchless output network of the system shown in FIG. 1 and as above discussed. Such modification of the output switchless network is in terms of using diode 40 in lieu of capacitor 36, and also the inclusion of diode 50 between junctions 60 and 74. The principal function of diode 50 is to permit charging current 62 to flow through winding 71 but to inhibit winding 71 from loading down capacitor 80 and preventing premature partial discharge of such capacitor. Otherwise, the operation of the system with this output network is similar to the operation of the system utilizing the network of FIG. 1a.

Figure 1D:
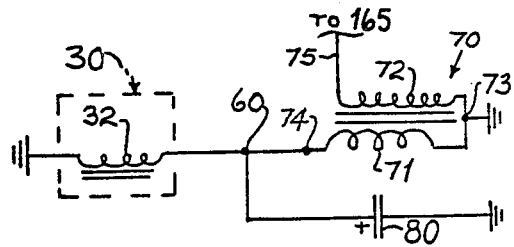
Figure 1E:
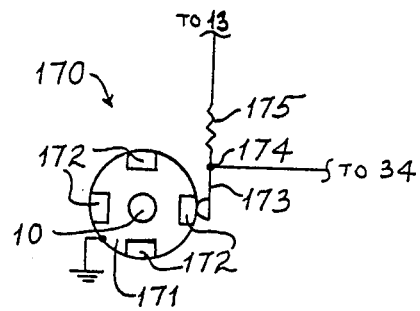
FIGS. 1e, 1f and 1g are respectively schematic drawings of a disk-contactor timer, a magnetically generating pulse timer and an optical beam pulse timer, any one of which can be used in lieu of the timer shown in FIG. 1.
Figure 1F:
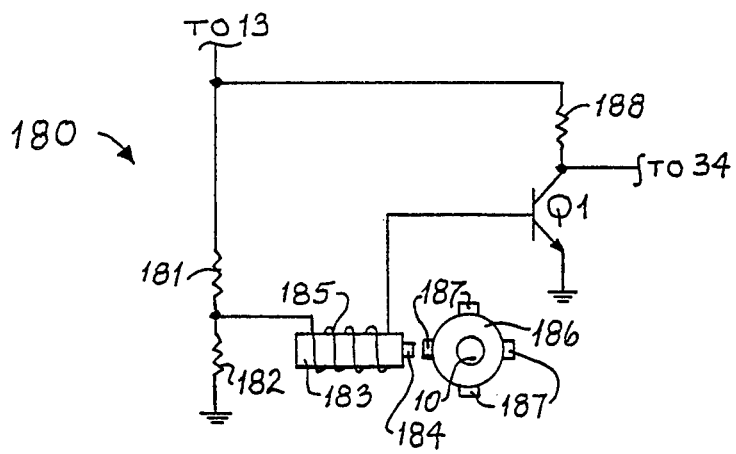
Figure 1G:
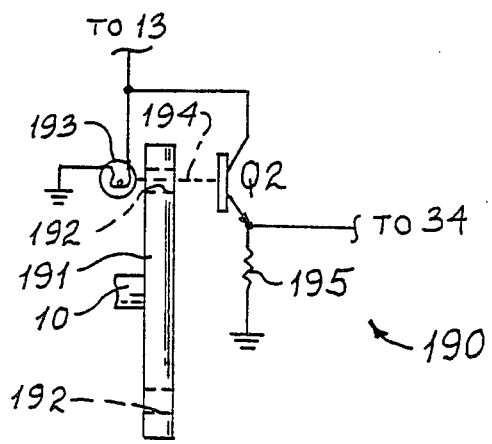

FIG. 1d modifies the switchless output network of the system shown in FIG. 1 and as above discussed. Such modification of the output switchless network is in terms of deletion of capacitor 36 so that winding 32 is connected directly to the parallel combination of primary winding 71 and capacitor 80. Use of this output network reduces the ignition primary current flow and igniter arc velocity as compared with the output network as used in FIG. 1, 1a, 1b or 1c.

It should be noted that diodes 40 and 50, capacitors 36 and 80, primary winding 71 and output winding 32 are all passive components since they do not internally generate electrical energy, and any electrical energy therein has to be supplied to these components. Inapposite, transistors or oscillators are active electronic components since they can contribute signal energy.

FIG. 1e illustrates a disk-contactor timer at 170, wherein disk 171 is of electrically conductive material and at ground potential by virtue of being affixed to engine distributor shaft 10 which is at ground potential. Disk 171 has electrically insulative members 172 regularly spaced at its periphery within the disk confines. The periphery of the disk is in cooperation with contactor 173 which has a resistor 175 in series therewith, the resistor being connected to a positive DC terminal at 13 of FIG. 1, instead of timer 20. Junction point 174 is connected to bias resistor 34 so that this timer can perform the same functions as timer 20. The logic provided by timer 170 is briefly stated in the following table:

| Contactor 173 Cooperating With | DC Potential at Junction 174 | Condition of Generator 30 |
| --- | --- | --- |
| conductive portion of disk 171 | 0 | does not oscillate |
| member 172 | + | oscillates |

FIG. 1f illustrates a magnetically generated pulse timer at 180, wherein magnetic reluctor wheel 186 is driven by engine distributor shaft 10. A positive DC potential is provided to this timer from junction 13 of FIG. 1, so that this time is connected to such junction instead of timer 20. A voltage divider resistive network 181 and 182 provides approximately +1.2 volts DC to coil 185, wound on permanent magnet core 183. Core 183 has a magnetic pole piece 184 for enabling magnetic flux to be induced in coil 185 by virtue of magnetic protrusions 187, integral with reductor wheel 186, being driven past pole piece 184 due to shaft 10 being driven by the engine. The other end of coil 185 is connected to the base of transistor Q1. Transistor Q1 has resistor 188 connected between its collector and junction 13. The emitter of Q1 is at ground potential, and the collector of Q1 is connected to bias resistor 34 of FIG. 1. When reluctor wheel 186 is at standstill, the base of transistor Q1 is at positive DC potential and Q1 conducts, thereby lowering the collector of Q1 to ground potential and inhibiting oscillation of generator 30 by virtue of zero bias being applied to the bases of transistors Q. When reluctor wheel 186 is driven by shaft 10 and when protrusions 187 are driven past pole piece 184, a negative-going spike is induced in winding 185, which spike is sufficient to overcome the positive DC potential at the base of Q1, thereby lowering the base of Q1 to a negative potential and stopping conduction of Q1 which raises the collector potential of Q1 to a positive value thereby applying a +DC bias voltage to bias resistor 34 of FIG. 1 and causing generator 30 to oscillate. The following table briefly shows the logic imposed by timer 180 upon the FIG. 1 system.

| Protrusion 187 | Potential at Base of Q1 | Condition of Q1 | DC Bias of Bases of Qs | Generator 30 |
|---|---|---|---|---|
| not driven past pole piece 184 | + | ON | 0 | does not oscillate |
| driven past pole piece 184 | − | OFF | + | oscillates |

FIG. 1g illustrates an optically generated pulse timer 190 which is connected to FIG. 1 in like manner as timer 20 but in lieu thereof. Timer 190 comprises an optically opaque disk 191 driven by distributor shaft 10. Disk 191 has a number of apertures 192 regularly spaced from each other at the disk periphery. A lamp or light-emitting diode 193 is connected to +DC potential at 13, and light-activated transistor switch Q2 has its collector connected to +DC potential at 13, the emitter of Q2 being connected to resistor 195 and the other side of resistor 195 being at ground potential. The emitter of Q2 is connected to bias resistor 34 of FIG. 1, so that this timer can bias generator 30 instead of timer 20. When disk 191 is driven so that its opaque portion blocks light beam 194 emanating from lamp 193, the base of Q2 is effectively at zero potential and Q2 does not conduct thereby causing its emitter to be at ground or zero potential and biasing resistor 34 to zero potential thereby inhibiting oscillation of generator 30. When disk 191 is driven to a position so that one of apertures 192 permits passage of light beam 194 therethrough to impinge on the base of Q2, the base of Q2 is raised to a positive potential which causes Q2 to conduct, thereby raising its emitter to a positive potential and biasing resistor 34 to a positive DC potential to cause generator 30 to oscillate. The logic provided by timer 190 may be briefly stated by the following table:

| Disk 191 Driven So That Light Beam 194 | Condition of Q2 | Emitter Potential of Q2 | Generator 30 |
|---|---|---|---|
| cannot impinge on base of Q2 | OFF | 0 | does not oscillate |
| impinges on base of Q2 | ON | + | oscillates |

Figure 3:
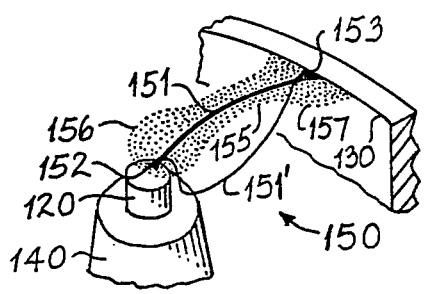
FIG. 3 is a perspective drawing of a portion of the base of an electrical igniter showing perspectively the arc phenomena created by the system of FIG. 1, 1a, 1b or 1c.

FIG. 3 is representative of the arc phenomena either when diodes 40 and/or 50 are in circuit, when capacitor 36 is in circuit, or when capacitor 36 and diode 50 are in circuit.

A portion of igniter base 130 is illustrated in FIG. 3 showing its threaded part and particularly the inner periphery of such electrically conductive base 130. Axial electrode 120 which is common to igniters is embedded in ceramic insulator 140, the firing end of electrode 120 protruding from insulator 140.

The igniter is shown generally at 150 and such numeral also identifies the high velocity arc that is created by the systems used to fire the igniter. Such arc appears to comprise an elongated core or filament of concentrated luminous particles 151 having spread-out terminations 152 and 153 at both the axial electrode and inner base periphery respectively. An aura of lesser concentration of luminous particles 155 surrounds core or filament 151, the ends 152 and 153 thereof being surrounded by enlarged spherical-like aura of luminous particles 156 and 157 respectively of such lesser particle concentration. The reason for both the spread-out ends 152 and 153 and the enlarged spherical aura 156 and 157 surrounding such ends respectively appears to be due to the high impact of these luminous particles upon the electrode and inner base periphery in view of the high velocity with which these luminous particles travel between such two points of the igniter base. One can analogize this phenomena to a bullet which spreads upon impact with a solid object due to the high bullet velocity, and the high density of the object which the bullet cannot penetrate upon impact, even due to its high velocity.

In either the situation using capacitor 36 or any of the diodes in circuit, or both, when the power delivered to generator 30 was dropped by reducing the voltage from battery 12 which energizes generator 30, arc filament 151 appeared to jump out from its position surrounded by the lesser concentrated luminous particles, to a position at 151' whereupon it followed the general contour of insulator 140 to terminate at inner periphery 130 at approximately the same location as when such filament had an arc locus as at 151. During change of locus from 151 to 151' the lesser concentrated luminous particle mass remained substantially unchanged.

It should be noted that the overall high arc velocity is evidenced by audible sounds occurring upon arc impact at 120 or 130, such audible sounds being not much lower in intensity under the arc locus 151' condition as compared to the arc condition locus at 151.

In either case, one important feature of this unusual arc configuration with its high velocity is that igniters can be used that have 250 thousandths of an inch radial spacing between its arcing members to produce long arcs which will not be extinguished by the high internal engine pressures, and thereby totally and efficiently burn and convert all the fuel to useful engine power without wasting a good percentage of such fuel.

Figure 5:
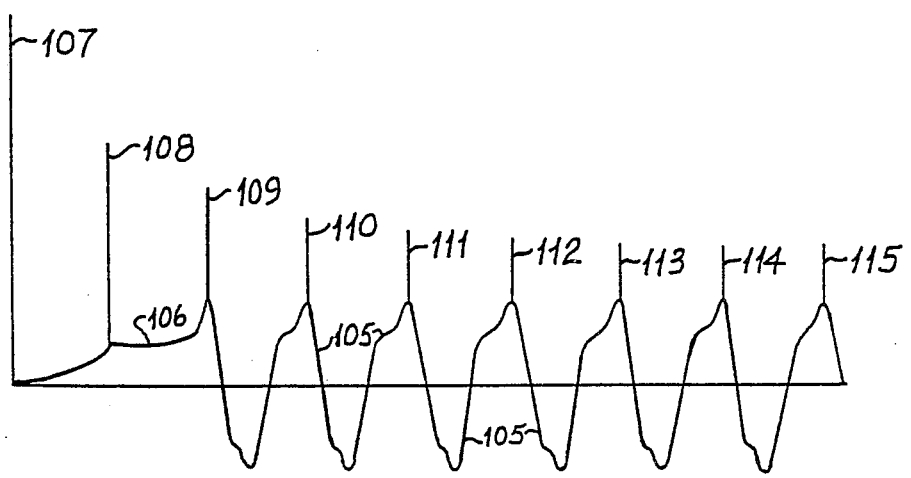
FIG. 5 is a voltage waveform seen on a high frequency oscilloscope screen when measured across one-half of a primary winding of a transformer used in the AC generator of the system of FIG. 1a or 1c, showing multi-spectra components created due to diode utilization in the output network.
Figure 6:
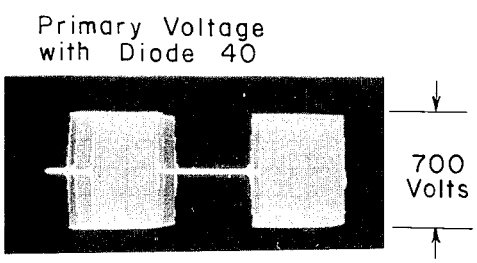
FIG. 6 is an oscilloscopic photograph of the voltage across the primary winding of the ignition transformer of the system of FIG. 1a or 1c during igniter firing due to diode utilization in the output network.
Figure 7:
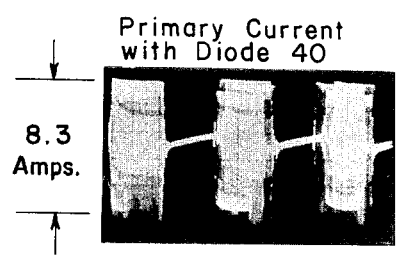
FIG. 7 is an oscilloscopic photograph of the current through the primary winding of the ignition transformer of the system of FIG. 1a or 1c during igniter firing due to diode utilization in the output network.

The oscilloscopic patterns for voltage and current of FIGS. 6 and 7 respectively, created by the system of FIG. 1a utilized diode 40. It is difficult to visually see individual ringing periods of these patterns in view of the fact that use of a diode in circuit with winding 32 and with inductor 71 and capacitor 80, gives rise to multi-spectra bands of frequency components containing many overlapping ringing components. Such overlapping ringing components may be seen when utilizing the most rapid sweep rate on the 50 megacycle oscilloscope, used to observe these phenomena. However, such overlapping ringing components or periods are too low in intensity to enable them to be photographically captured. Since a fast oscilloscope time base sweep rate will disclose the multi-spectra frequency bands for each charge-discharge cycle, such spectra was carefully observed and copied in the drawings as shown in FIGS. 4 and 5.

Figure 4:
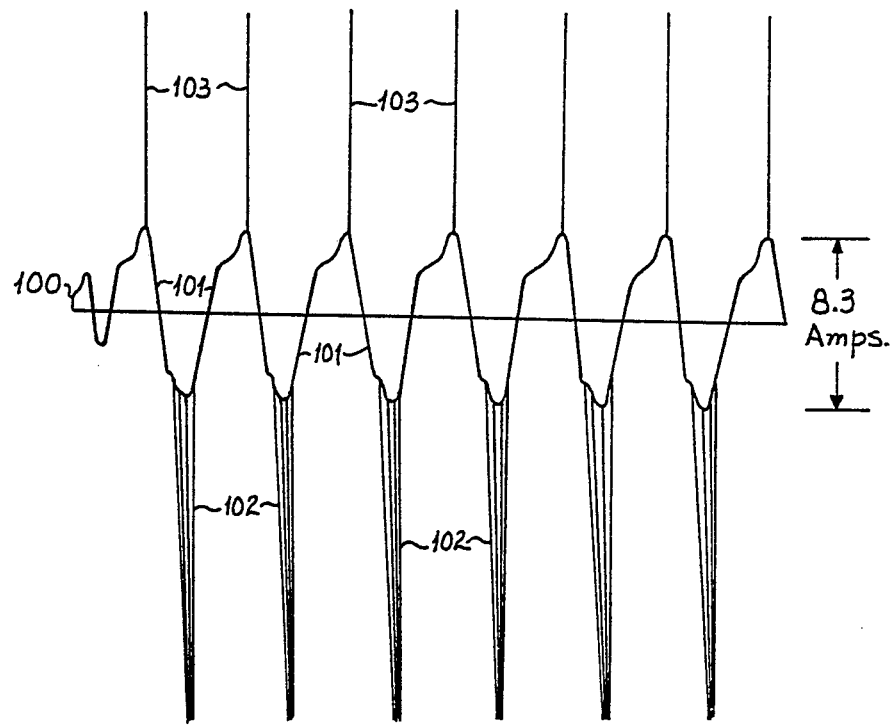
FIG. 4 is a drawing of a current waveform in an ignition transformer primary winding produced by the system of FIG. 1a or 1c, showing multi-spectra current components associated with each current repetion period due to use of diodes. Such waveform was observed using a high frequency oscilloscope.

FIG. 4 shows the current wave in primary winding 71 when using a ten-times expanded sweep of a portion of one of the current waveforms of FIG. 7. The dominant current excursions of 8.3 amperes as shown in FIG. 7 are denoted in FIG. 4 as waveforms 101. The hairlike patterns at the lower extremes of the waveforms of FIG. 7 are denoted in FIG. 4 at 102. Such hairlike patterns are the principal multi-spectra bands 102 existing for each dominant current excursion 101 a shown in FIG. 4. Additionally, FIG. 4 shows a single perturbation at 100, at the beginning of the current waveform, and also shows other spectral frequency groups 103 associated with and extending upward from the positive half of each current cycle of such waveform. Such spectra 103 are not photographically capturable in FIG. 7 in view of the low light intensities on the oscilloscope screen. Such spectra 103 also provide groups of ringing cycles, but in lesser quantity than spectral groups 102. It should be pointed out that the respective heights of spectral groups 102 and 103 is unknown inasmuch as these amplitudes appeared to continue on the face of the oscilloscope screen well beyond the oscilloscope's vertical beam shifting control capability. It would not be unreasonable to state that each group 102 and 103 spectra may represent current swings in excess of 100 amperes, though at comparatively low duty rates.

In the system of FIG. 1a, utilizing diode 40, the voltage excursions during igniter firing as shown in FIG. 6, do not appear to illustrate multi-spectra bands such as 102 or 103. The lack of such spectral bands in the voltage pattern is not fully understood.

Figure 8:
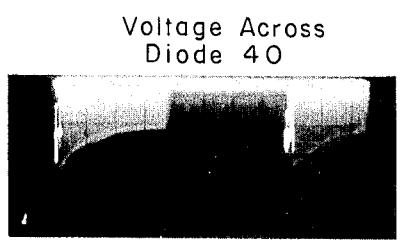
FIG. 8 is an oscilloscopic photograph of the voltage across one of the diodes used in the system of FIG. 1a or 1c.
Figure 9:
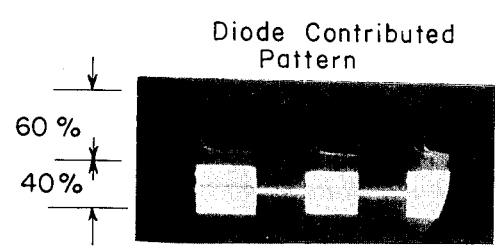
FIG. 9 is an oscilloscopic photograph of the voltage as measured across one-half of the primary winding of a transformer used in the AC generator of the system of FIG. 1a or 1c due to diode utilization in the output network.

The fact that the multi-spectral bands exist in the current pattern of the system of FIG. 1a, which utilizes a diode, is also evidenced by the patterns of FIGS. 5, 8 and 9.

FIG. 8 is an oscilloscopic pattern of the voltage across diode 40. FIG. 9 shows the presence of the FIG. 8 oscilloscopic pattern carried on top of the voltage waveform as measured across one-half of winding 31. FIG. 5 is the waveform of FIG. 9 as observed on the oscilloscopic screen when the time base sweep rate of the oscilloscope was ten-times expanded. Since FIGS. 5 and 9 represent voltages across winding 31 and since FIG. 8 shows the voltage across diode 40 in series with winding 32, which voltage induced in winding 32 is opposite in phase to the phase of the voltage induced in winding 31, the phases of these patterns can be expected to be reversed since such voltages are measured at two different windings of a transformer. It is therefore obvious that FIG. 8 pattern is due to the same cause that creates the pattern riding on top of the dominant waveform in FIG. 9. The contribution due to diode 40 is about 60 percent in peak amplitude of the total waveform in FIG. 9 in which the dominant pattern is only 40 percent of such total amplitude.

Examining the ten-times expanded waveform of FIG. 9, as shown in FIG. 5, it can be seen that the dominant pattern of such waveform will start with a distorted rectangular wave portion 106 followed by a plural number of similarly-shaped distorted sinusoids 105. This wave will exhibit positive spectra groups starting with spectrum 107 which has the highest amplitude, followed by spced spectral groups 108 through 115 of decreasing amplitudes. Each spectral group will contribute to the ringing spectral groups discussed above in connection with FIGS. 4 and 7.

Examining FIG. 1b, it should be noted that negative components of ringing periods can flow through winding 32 even with a diode such as diode 50 effectively connected in series with winding 71 between junctions 60 and 74, in view of the fact that negative ringing current portions will flow in direction from cathode to anode of such diodes. The fact such diode contributes to the multi-spectra bands is easily shown by short-circuiting such diode, whereupon the spectral contributions shown in FIGS. 4, 5, 7, 8 and 9, disappear.

Consequently, in FIG. 1c, to inhibit ringing components having positive current directions from flowing through winding 32 during the discharge of capacitor 80 and winding 71, diode 40 is utilized. Diode 40 will oppose positive components of discharge currents 64 and 65 from flowing through junction 60 into winding 32 and force positive components of discharge current 65 to flow in the same direction as the flow of positive discharge current component 64, namely, through capacitor 80 and winding 71, thereby aiding each other and increasing the power applied to any igniter. Additionally, the use of diode 50 in conjunction with diode 40, produces excellent results. Diode 50 is effectively in series with winding 71 as part of the inductive load portion of the system.

Importantly, it should be noted that the use of diode 40 alone or in combination with diode 50 results in substantial increase in velocity of arc firing across the igniter base. Photographic results of such firing are depicted at 161, 162 and 163 of FIG. 14. Igniter 161 has an 18 millimeter base and shows the arc between its center electrode and periphery of the base. Such arc is of dumbbell-shape having a thick body portion and enlarged generally spherically-shaped ends at both the center electrode and inner wall of the base. Such enlarged arc terminations are due to the arc molecular impact resulting from the highly unusual arc velocity upon the center electrode and base. The arc impact is at dual points in view of the alternating current or bipolar ringing cycles obtained by this system. Igniter 162 has a 14 millimeter base and also shows a similar arc to that of igniter 161. Igniter 163 also has a 14 millimeter base wherein two such arcs were photographed in two successive igniter firing periods on the same photographic plate. Since it was difficult to synchronize the camera shutter with the increased arc velocities, the shutter was opened for a relatively long period of time so that the arc could be photographed when it occurred, and in the case of igniter 163, by the time the shutter was closed, two such arcs were photographically recorded.

Figure 14:
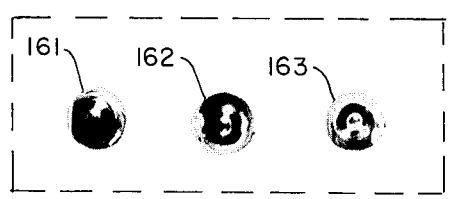
FIG. 14 includes three photographic pictures taken of the bases of three igniters during firing periods of such igniters during operation of the system of FIG. 1, 1a or 1d, showing the unusual arc phenomena.

The photographs of the arcs in FIG. 14 are too small to gain an appreciation of their structure and functional characteristics. Hence, such arcs were observed over long periods of time, and a representation of one such arc was drawn in a detailed and enlarged view in FIG. 3.

Referring to FIGS. 1, 1a, 3 and 10 through 14, and for the purpose of photographing the phenomena in FIGS. 10 through 13, the FIG. 1 system did not make use of diodes. Such FIG. 1 system did utilize capacitor 36. The transformer in generator 30 was also changed to one providing a higher turns ratio of windings 32 to 31, which accounted for the increased primary voltage and current exhibited in FIGS. 10 through 13 patterns. The use of capacitor 36 instead of any diode such as diode 40, resulted in the same types of arcs as shown in FIGS. 3 and 14, as discussed above in connection with diode usage, but the electrical voltage and current patterns as in FIGS. 10 through 13 clearly showed the multiplicity of ringing cycles for any one igniter firing period. It should be noted that the same result obtained when, after taking the photographs of FIGS. 10 through 13, diode 40 was added to the circuit of FIG. 1 in series with capacitor 36, showing that in the circuit utilizing capacitor 36, such capacitor was the controlling component when both the capacitor and diode were utilized.

Capacitor 36 either avoids the creation of multi-spectra bands as when diodes were used, or when used in conjunction with one or more of these diodes, acts as a filter for such multi-spectra bands as created by the diodes. Without any of the diodes in the circuit, but with capacitor 36 in the circuit, such capacitor also represses some of the very high frequency components, making it possible to clearly see the multiple ringing cycles in the oscilloscopic patterns of FIGS. 11 and 13.

Figure 10:
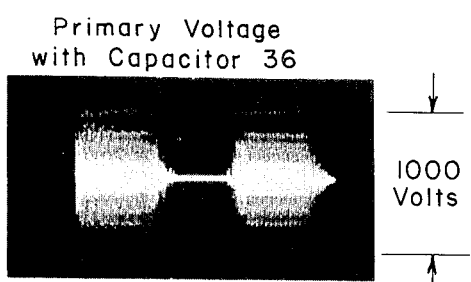
FIG. 10 is an oscilloscopic photograph of the voltage across the primary winding of the ignition transformer of the system of FIG. 1 or 1b during igniter firing when another capacitor is inserted in series with the parallel combination of a capacitor and primary winding in the output network.
Figure 11:
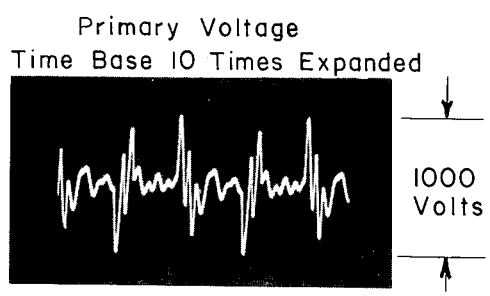
FIG. 11 is an oscilloscopic photograph of the voltage shown in the photograph of FIG. 10 depicting a plurality of ringing waveforms existing in the igniter firing voltage pattern of FIG. 10. The ringing waveforms were seen in detail by expanding the sweep rate of the oscilloscope time base by a factor of ten.

FIG. 10 shows 1,000 volts peak-to-peak developed across the primary 71 and shows two successive igniter firing periods. The pattern resulting in FIG. 11 is by virtue of a ten-times expanded time base of the time base sweep of the oscilloscope, as compared with the sweep rate used to obtain FIG. 10, so that only a fractional part of one of the igniter firing periods of FIG. 10 may be seen as expanded in FIG. 11, showing a plural number of sequential voltage ringing cycles, each having bipolar ringing excursions. Each ringing cycle was generated by the charge and discharge phases during respective conductive and quiescent portions 91 and 92 of the waveform of FIG. 2, as provided by generator 30.

Figure 12:
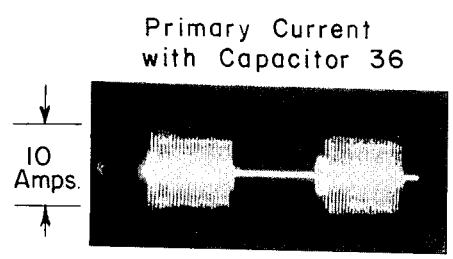
FIG. 12 is an oscilloscopic photograph of the current through the primary winding of the ignition transformer of the system of FIG. 1 or 1b during igniter firing when an additional capacitor is inserted in series with the parallel combination of a capacitor and primary winding in the output network.
Figure 13:
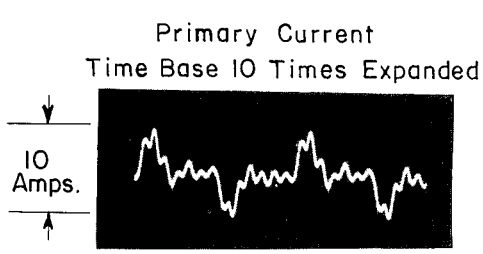
FIG. 13 is an oscilloscopic photograph of the current shown in the photographic of FIG. 12 depicting a plurality of ringing waveforms existing in the igniter firing current pattern of FIG. 12. The ringing waveforms were seen in detail by expanding the sweep rate of the oscilloscope time base by a factor of ten.

Some of the ringing cycles for one ignition firing period of the voltage pattern of FIG. 10 may be clearly seen in the ten times expanded time base of pattern shown in FIG. 11, while some of the ringing cycles for one ignition firing period of the current pattern of FIG. 12 may be clearly seen in the ten times expanded time base of the pattern shown in FIG. 13.

FIG. 12 shows a current through primary winding 71 of 10 amperes peak-to-peak during each of the same two successive igniter firing periods as in the case of the voltage pattern of FIG. 10. Currents up to 16 amperes were obtained, dependent on the transistors used and the design of the transformer of generator 30. The current ringing cycles as in FIG. 13 when observed on the face of the 50 megacycle oscilloscope displayed thin high frequency spectral lines in both positive and negative directions, repeating about every quarter cycle, but such spectral lines were difficult to capture photographically in view of their low optical intensity.

FIG. 14, the illustration of igniter bases 161, 162 and 163, with their respective arcs, also represents the arcs created due to the use of capacitor 36 in lieu of any of the diodes, or jointly with the use of any of the diodes.

Referring to ALL FIGURES, in the laboratory test set up of this system, a conventional distributor was motordriven by driving shaft 10 thereof at a speed comparable to an engine's 3,000 revolutions per minute. The distributor had four igniter ports so that four igniters were fired in sequence. The gap-adjusting members from each of the igniters were removed so that the generated arc could fire between the axial electrode 120 and the inner periphery of the igniter base 130. Igniters having 18 and 14 millimeter diameter bases were used. Therefore, the arc lengths at 150, between the axial electrode and base, ranged between 250 and 350 thousandths of an inch in length.

The contactors in the experimental distributor, analogous to contactors 22 and 23 of timer 20, were set so that they were opened and closed for 5 millisecond periods each when the distributor shaft was driven at a rate of speed comparable to an engine speed of 3,000 revolutions per minute. Such firing period would be the same as in an actual automotive four-cylinder engine driven at 3,000 revolutions per minute representing average engine speed, wherein the dwell time of the contactors in the distributor would be set to be equal to their non-dwell time.

The measurements of voltage and current were made using an accurately calibrated Hewlett-Packard 50 megahertz oscilloscope. The current was measured by utilizing a one-ohm high power resistor in series with winding 71 and measuring the voltage across the one-ohm resistor using the calibrated oscilloscope. The voltage across winding 71 and capacitor 80 was measured by using a high resistance voltage divider across winding 71 substantially higher in resistance than the impedance presented by the parallel combination of winding 71 and capacitor 80, so as to effect reasonably accurate voltage readings across the lower resistance portion of such voltage divider. The fact that the voltage divider was of sufficiently high resistance value to enable making such measurements was determined by observing that the voltage oscilloscopic pattern did not decrease in amplitude when such voltage divider was connected across winding 71. The need for such voltage divider was due to the fact that the internal attenuators of the oscilloscope were in themselves not sufficient to reduce the actual voltage excursions so as to bring the entire peak-to-peak voltage envelope within the confines of the face of the oscilloscope's cathode ray tube.

Without diode 40 or capacitor 36 in the output network as shown in the FIG. 1d switchless output network, the large arcs developed across the bases of the igniters did not appear to exhibit as high a velocity as with the use of such diode or capacitor. With such diode or capacitor in the switchless output network the velocity of such arcs increased dramatically, developing sounds comparable to the cracking of a whip or even lightning discharge sounds. With such diode or capacitor in the output network the high velocity arc excursions between axial electrode 120 and base 130 of igniter 150 were accompanied by spheres of flashing light at the extremities 152 and 153 of the arc pattern.

What is claimed is:

1. An inductive-capacitive cyclic charge-discharge ignition system for providing a plurality of ignition periods, comprising the combination of:

an ignition transformer having a primary winding;

a capacitor connected to the primary winding and forming a parallel circuit with said primary winding;

a first diode in series with said parallel circuit;

AC generating means having an output winding in series with the first diode for powering said first diode and parallel circuit with AC energy during each said ignition period, said output winding, first diode and parallel circuit forming a switchless output network; and timing means coupled to said AC generating means for controlling DC bias current to said generating means so as to duty cycle said generating means.

2. The system as stated in claim 1, wherein said switchless output network includes a second diode interposed between said primary winding and first diode, and a junction formed between said first and second diodes to which said capacitor is connected.

3. The system as stated in claim 1, including:

a secondary winding of said ignition transformer coupled to the primary winding; and at least one electrical ignition means having an electrically conductive tubular base and an electrode insulated from said base intermittently coupled to the secondary winding for producing an electrical arc having an elongated filament composed of luminous particles and a mass of luminous particles of lesser density than said filament that surrounds said filament between said electrode and base during each said ignition period.

4. The system as stated in claim 1, wherein said timing means constitutes a cam-actuated pair of contactors.

5. The system as stated in claim 1, wherein said timing means constitutes an electrically conductive disk having electrically insulative members regularly spaced at the periphery of and within the confines of said disk and an electrically conductive contactor in cooperation with said periphery.

6. The system as stated in claim 1, wherein said timing means is a magnetically generated pulse timer.

7. The system as stated in claim 1, wherein said timing means is an optically generated pulse timer.

8. A method for producing electrical ignition power during each ignition period of an ignition system, comprising in combination the steps of:

(a) duty cycling an AC generator so as to produce AC energy during each said ignition period;

(b) generating multi-spectral bands of frequencies by passing said AC energy by means of an output winding of said AC generator through a diode in series with a parallel combination of a capacitor and a primary winding of an ignition transformer; and (c) exciting an electrical igniter with said bands of frequencies for each said ignition period.

9. The method as stated in claim 8, including the further step of:

(d) creating an electrical arc between an electrically conductive tubular base and an electrode of said igniter, said arc having a filament of luminous particles extending between said base and electrode and a mass of luminous particles of lesser density than said filament which surrounds said filament.

10. The method as stated in claim 9, wherein said foregoing steps effect an increase in the velocity of said luminous particles composing said arc.

* * * * *